US011706596B2

United States Patent
Ahmad et al.

(10) Patent No.: US 11,706,596 B2
(45) Date of Patent: Jul. 18, 2023

(54) VEHICLE ROADSIDE UNIT INTERFERENCE DETECTION

(71) Applicant: FORD GLOBAL TECHNOLOGIES, LLC, Dearborn, MI (US)

(72) Inventors: Syed Amaar Ahmad, Canton, MI (US); Ivan Vukovic, Birmingham, MI (US); Colin Lieberman, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 17/350,123

(22) Filed: Jun. 17, 2021

(65) Prior Publication Data

US 2022/0407615 A1 Dec. 22, 2022

(51) Int. Cl.
*H04B 17/318* (2015.01)
*H04B 17/345* (2015.01)
(Continued)

(52) U.S. Cl.
CPC .......... *H04W 4/44* (2018.02); *H04B 17/318* (2015.01); *H04B 17/345* (2015.01); *H04L 43/04* (2013.01); *H04L 43/0829* (2013.01); *H04L 43/0882* (2013.01); *H04L 43/16* (2013.01); *H04W 4/021* (2013.01); *H04W 24/08* (2013.01); *H04W 24/10* (2013.01); *H04W 28/0226* (2013.01); *H04W 28/0231* (2013.01); *H04W 84/005* (2013.01); *H04W 84/02* (2013.01); *H04W 88/02* (2013.01); *H04W 88/08* (2013.01); *H04W 88/18* (2013.01); *H04W 92/02* (2013.01); *H04W 92/045* (2013.01); *H04W 92/10* (2013.01); *H04W 92/18* (2013.01)

(58) Field of Classification Search
CPC . H04B 17/0082–409; H04L 43/02–55; H04W 4/02–029; H04W 4/30–80; H04W 8/15–245; H04W 24/02–10; H04W 28/02–26; H04W 36/0005–385; H04W 40/005–38; H04W 72/005–14; H04W 74/002–0891; H04W 76/10–50; H04W 84/005–22; H04W 88/005–188; H04W 62/02–24
See application file for complete search history.

(56) References Cited

U.S. PATENT DOCUMENTS 8,805,285 B2 8/2014 Thota et al.
10,291,744 B2 5/2019 Sun
(Continued)

*Primary Examiner* — Timothy J Weidner
(74) *Attorney, Agent, or Firm* — Joseph Kane; Brooks Kushman P.C.

(57) ABSTRACT

An infrastructure device includes a transceiver, programmed to communicate with a plurality of vehicles, wherein at least one of the vehicles is located within a distance defined from a location of the infrastructure device, and at least one of the vehicles is located outside the distance from the location of the infrastructure device; and a controller, programmed to measure a channel busy ratio (CBR) for communication with the plurality of vehicles, measure a package error rate (PER) for communication with one or more of the vehicles located within the distance, and responsive to the CBR being greater than a CBR threshold, or the PER being greater than a PER threshold, record an interference event into a log.

17 Claims, 4 Drawing Sheets

(51) Int. Cl.
*H04L 43/04* (2022.01)
*H04L 43/0829* (2022.01)
*H04L 43/0882* (2022.01)
*H04L 43/16* (2022.01)
*H04W 4/021* (2018.01)
*H04W 4/44* (2018.01)
*H04W 24/08* (2009.01)
*H04W 24/10* (2009.01)
*H04W 28/02* (2009.01)
*H04W 84/00* (2009.01)
*H04W 84/02* (2009.01)
*H04W 88/02* (2009.01)
*H04W 88/08* (2009.01)
*H04W 88/18* (2009.01)
*H04W 92/02* (2009.01)
*H04W 92/04* (2009.01)
*H04W 92/10* (2009.01)
*H04W 92/18* (2009.01)

(56) References Cited

U.S. PATENT DOCUMENTS

| | | |
|---|---|---|
| 10,327,254 B2 | 6/2019 | Thanayankizil et al. |
| 2019/0045454 A1* | 2/2019 | Haran ................. H04W 72/082 |
| 2020/0029233 A1* | 1/2020 | Gallagher ............... H04W 4/40 |
| 2021/0345180 A1* | 11/2021 | Peng ................. H04W 72/0406 |
| 2022/0085899 A1* | 3/2022 | Vukovic ................. H04W 4/40 |

\* cited by examiner

VEHICLE ROADSIDE UNIT INTERFERENCE DETECTION

TECHNICAL FIELD

The present disclosure generally relates to a method for detecting wireless signal interference. More specifically, the present disclosure relates to a method for detecting wireless signal interference for a roadside unit (RSU) communicating with vehicles.

BACKGROUND

Vehicle-to-everything (V2X) is a type of communication that allows vehicles to communicate with various aspects of the traffic environment. This communication may include interaction between a vehicle and infrastructure using vehicle-to-infrastructure (V2I) communication. Vehicles may include wireless transceivers and vehicle on-board units (OBUs) to facilitate the V2X communication. RSUs may provide wireless communications from roadside infrastructure to the OBUs. Such communication may be referred to as infrastructure-to-vehicle (I2V) communication. RSUs generally operate in the same frequency band as V2X, over technologies such as Cellular Vehicle-to-Everything (CV2X) and Dedicated Short Range Communications (DSRC).

The Institute of Electrical and Electronics Engineers (IEEE) 802.11p standard and The Third Generation Partnership Project (3GPP) Long-Term Evolution (LTE) standard both include a designated Intelligent Transportation System (ITS) band to carry the V2X communication. The ITS band is a licensed band of 5.9 GHz (5.895-5.925 GHz) which overlaps in frequency with one or more unlicensed bands. For instance, the ITS band partially overlaps with Unlicensed National Information Infrastructure (U-NII)—4 band ranging from 5.850-5.925 GHz designated by IEEE 802.11ac standard.

SUMMARY

In one or more illustrative embodiments of the present disclosure, an infrastructure device includes a transceiver, programmed to communicate with a plurality of vehicles, wherein at least one of the vehicles is located within a distance defined from a location of the infrastructure device, and at least one of the vehicles is located outside the distance from the location of the infrastructure device; and a controller, programmed to measure a channel busy ratio (CBR) for communication with the plurality of vehicles, measure a package error rate (PER) for communication with one or more of the vehicles located within the distance, and responsive to the CBR being greater than a CBR threshold, or the PER being greater than a PER threshold, record an interference event into a log.

In one or more illustrative embodiments of the present disclosure, a communication device includes a wireless transceiver, programmed to communicate with a plurality of entities, wherein at least one of the entities is located within a geo-fence defined around a location of the communication device, and at least one of the entities is located outside the geo-fence; and a controller, programmed to measure a first parameter for communications with the plurality of entities, measure a second parameter for communications with one or more of the entities located within the geo-fence, the second parameter being different from the first parameter, and responsive to the first parameter being greater than a first threshold, and the second parameter being greater than a second threshold, record an interference event into a log.

In one or more illustrative embodiments of the present disclosure, a method for a communication device includes defining, via a processor, a geo-fence within a distance threshold from the communication device; measuring, via a transceiver, a channel busy ratio (CBR) for communications with a plurality of vehicles having at least one vehicle located within the geo-fence and at least one vehicle located outside the geo-fence; measuring, via the transceiver, a package error rate (PER) for communications with one or more of the vehicles located within the geo-fence; and responsive to the CBR being greater than a CBR threshold, and the PER being greater than a PER threshold, record, via the processor, an interference event into a log.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Figure 1:
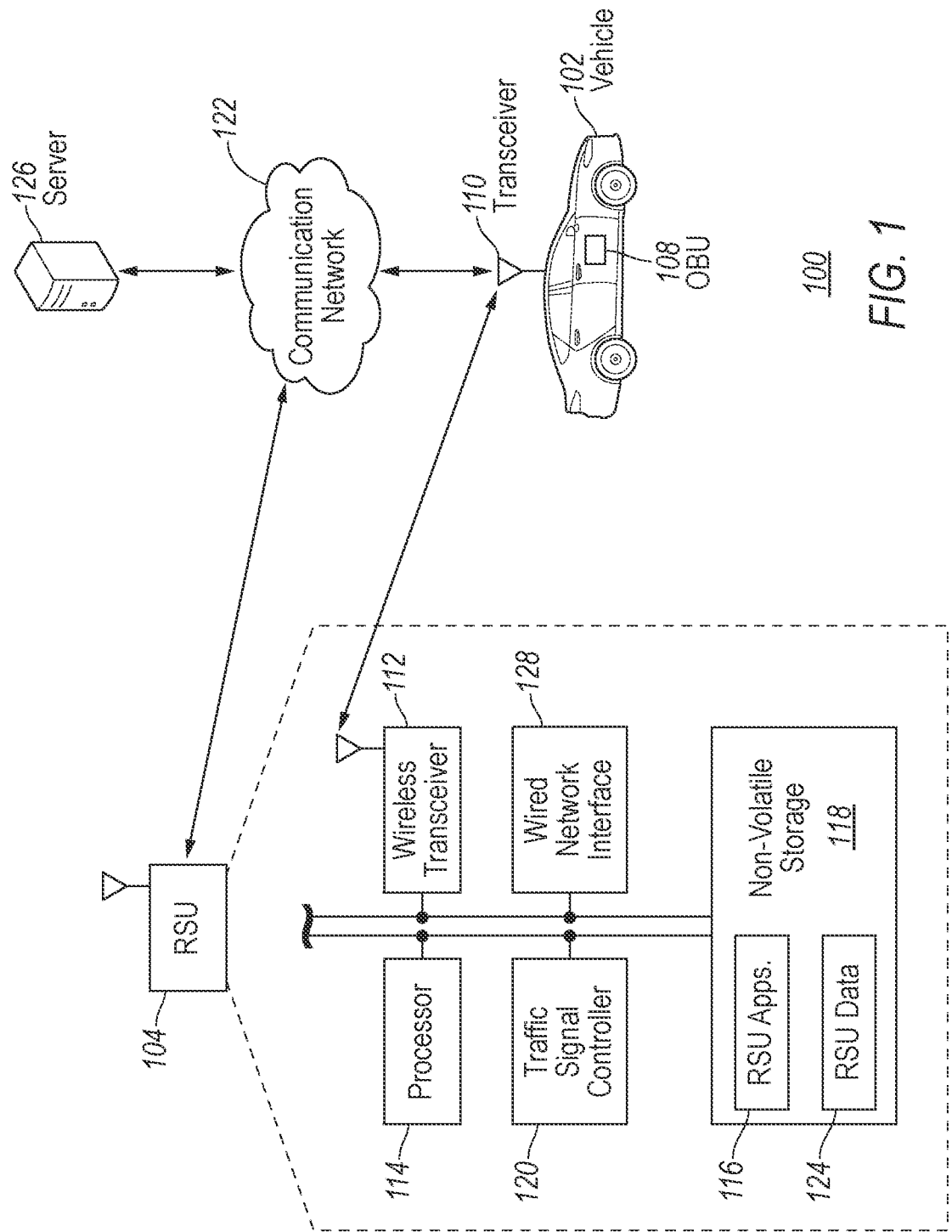
FIG. 1 illustrates an example block diagram for a V2I communication system of one embodiment of the present disclosure.

FIG. 1 illustrates an example block diagram for a V2I communication system 100. As shown, the system 100 may include one or more wireless-enabled vehicles 102 configured to communicate with a RSU 104 via a wireless connection 106. For simplicity, only one vehicle 102 is illustrated in FIG. 1. The vehicle 102 may include an OBU 108 and a transceiver 110 configured to establish the wireless connection 106 with a corresponding wireless transceiver 112 of the RSU 104. As an example, the vehicle 102 and the RSU 104 may communicate on ITS band over CV2X. The RSU 104 may include various components configured to perform various operations. For instance, the RSU 104 may include one or more processors 114 configured to perform instructions, commands, and other routines in support of the processes described herein. For instance, the RSU 104 may be configured to execute instructions of RSU applications 116 to provide features such as wireless communications and traffic signal controls. Such instructions and other data may be maintained in a non-volatile manner using a variety of types of computer-readable storage medium 118. The computer-readable medium 118 (also referred to as a processor-readable medium or storage) includes any non-transitory medium (e.g., tangible medium) that participates in providing instructions or other data that may be read by the processor 114 of the RSU 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The vehicles 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PREV), or a parallel/series hybrid electric vehicle (PSREV). As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The OBU 108 may be configured to provide telematics services to the vehicle 102. These services may include, as some non-limiting possibilities, navigation, turn-by-turn directions, vehicle health reports, local business search, accident reporting, and hands-free calling. The OBU 108 may be in communication with the transceiver 110. The OBU 108 may, additionally, be configured to communicate over a broadcast peer-to-peer protocol (such as PC5), to facilitate V2X communications with devices such as the RSU 104. It should be noted that these protocols are merely examples, and different peer-to-peer and/or cellular technologies may be used.

The RSU 104 may be configured to perform various operations to facilitate the driving of the vehicle 102. For instance, the RSU 104 may be configured to control traffic signals based on the communication with the one or more vehicles 102. The signal control operations may be performed via a traffic signal controller 120 integrated with the RSU 104. Alternatively, the traffic signal controller 120 may be an individual device in communication with the RSU 104 via a local connection. In an example, the traffic signal controller 120 may be configured to control one or more traffic lights at an intersection. Using the OBU 108, the vehicle 102 may communicate with the RSU 104 via a direct wireless connection 106. Additionally or alternatively, the vehicle 102 may communicate with the RSU 104 via a communication network 122. The RSU 104 may be further configured to measure a signal strength from the vehicle 102 and detect a signal interference for the wireless connection 106. The interference may be record as data logs as part of RSU data log 124 stored in the storage 118. The RSU may be further configured to communicate with a remote server 126 via the communication network 122 through the wireless transceiver 112 and/or a wired network interface 128. It should be noted that the system 100 illustrated in FIG. 1 is merely an example, and systems having more, fewer, and different arrangements of elements may be used. The terms communication network and server are used as general terms in the present disclosure and may include any computing network involving mobile carriers, router, computers, controllers or the like configured to store data and perform data processing functions and facilitate communication between various entities.

The communication network 122 may provide communications services, such as packet-switched network services (e.g., Internet access, voice over Internet Protocol (VoIP) communication services), to devices connected to the communication network 122. An example of a communication network 122 is a cellular telephone network. For instance, the OBU 108 may access the cellular network via connection to one or more cellular towers. To facilitate the communications over the communication network 122, the RSU 104 and the OBU 108 may be associated with unique device identifiers (e.g., mobile device numbers (MDNs), Internet protocol (IP) addresses, etc.) to identify the communications of the RSU 104 and the OBU 108 on the communication network 122.

Figure 2:
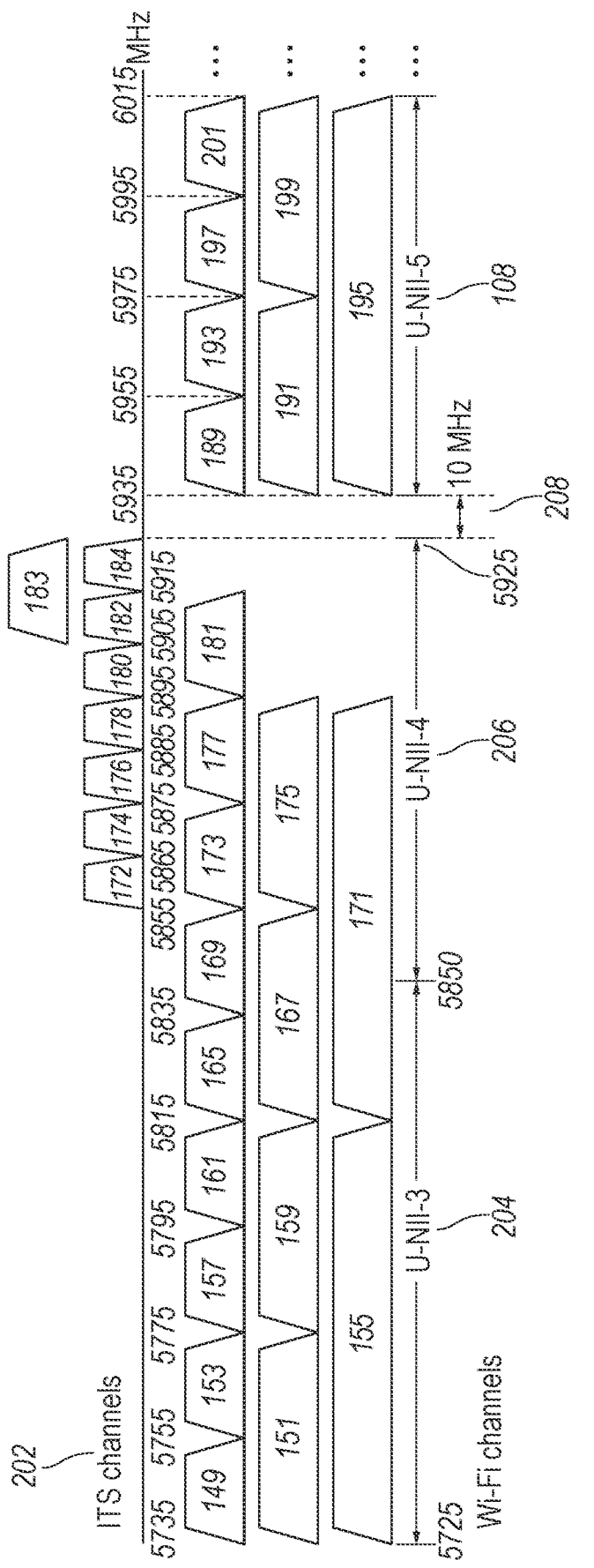
FIG. 2 illustrates an example frequency diagram for ITS channels with adjacent unlicensed bands of one embodiment of the present disclosure.

Referring to FIG. 2, an example frequency diagram 200 for a portion of ITS channels with adjacent unlicensed channels of one embodiment of the present disclosure is illustrated. As a few non-limiting examples, ITS channels 202 may include Channel 172 ranging from 5.855-5.865 GHz; Channel 174 ranging from 5.865-5.875 GHz; Channel 176 ranging from 5.875-5.885 GHz; Channel 178 ranging from 5.885-5.895 GHz; Channel 180 ranging from 5.895-5.905 GHz; Channel 182 ranging from 5.905-5.915 GHz; and Channel 184 ranging from 5.915-5.925 GHz in frequency. Multiple ITS channels may be combined to form a new channel. For instance, Channel 182 and Channel 184 may be combined to form an ITS Channel 183 ranging from 5.905-9.925 GHz in frequency. Each ITS channel has a 10 MHz or 20 MHz bandwidth. For instance, each even-numbered ITS channel (e.g. Channel 182) may have a 10 MHz bandwidth, whereas each odd-numbered ITS channel (e.g. Channel 183) may have a 20 MHz bandwidth. The frequency of ITS channels 202 may overlap and/or be adjacent to the frequency one or more Wi-Fi channels including a U-NII-3 band ranging from 5.725-5.850 GHz; a U-NII-4 band ranging from 5.850-5.925 GHz; and a proposed U-NII-5 band ranging from 5.925-6.425 GHz in frequency. Each U-NII band may include a plurality of channels. For instance, U-NII-3 band may include Channel 149 ranging from 5.735-5.755 GHz; Channel 153 ranging from 5.755-5.775 GHz; Channel 157 ranging from 5.775-5.795 GHz; Channel 161 ranging from 5.795-5.815 GHz; and Channel 165 ranging from 5.815-5.835 GHz in frequency. The U-NII-4 band may include Channel 169 ranging from 5.835-5.855 GHz; Channel 173 ranging from 5.855-5.875 GHz; Channel 177 ranging from 5.875-5.895 GHz; and Channel 181 ranging from 5.895-5.915 GHz in frequency. Each of the above U-NII channel has a bandwidth of 20 MHz. Multiple channels from one or more U-NII bands may be combined to form a new channel having a greater bandwidth. For instance, Channel 149 and Channel 153 may be combined into Channel 151; Channel 157 and Channel 161 may be combined into Channel 159; Channel 165 and Channel 169 may be combined into Channel 167; and Channel 173 and Channel 177 may be combined into Channel 175 each of which having a 40 MHz bandwidth.

Channel 151 and Channel 159 may be further combined in Channel 155; and Channel 167 and Channel 175 may be further combined in Channel 171 each having an 80 MHz bandwidth.

The frequency of ITS channels 202 may further overlap or be adjacent to the frequency of the proposed U-NII-5 band ranging from 5.925-6.425 GHz having multiple channels. Since the specification of U-NII-5 band has not been finalized yet, the numbering and frequency of each specific channel may vary depending of the specific version and implementation. However, the embodiment of the present disclosure may apply to various versions of U-NII-5 band under substantially the same concept. U-NII-5 band may include Channel 189 ranging from 5.935-5.955 GHz; Channel 193 ranging from 5.955-5.975 GHz; Channel 197 ranging from 5.975-5.995 GHz; and Channel 201 ranging from 5.995-6.015 GHz in frequency each having a 20 MHz bandwidth. Channel 189 and channel 193 may be combined into Channel 191; and Channel 197 and Channel 201 may be combined into Channel 199 each having a 40 MHz bandwidth. Channel 191 and Channel 199 may be further combined into Channel 195 Having an 80 MHz bandwidth.

As illustrated in FIG. 2, the frequency of one or more ITS channels overlap with the frequency of one or more U-NII channels. For instance, ITS channel 176 and channel 178 completely or partially overlap U-NII channels 177, 175 and 171, and therefore may be particularly vulnerable to the interference from those U-NII channels. Wireless signal interference may be caused not only by transmission frequency overlap, but also adjacent channels transmitting wireless signals in close frequencies. For instance, ITS channel 184 may interfere with U-NII-5 189, 191 and 195 despite a 10 MHz gap 208 applied between the channels.

Figure 3:
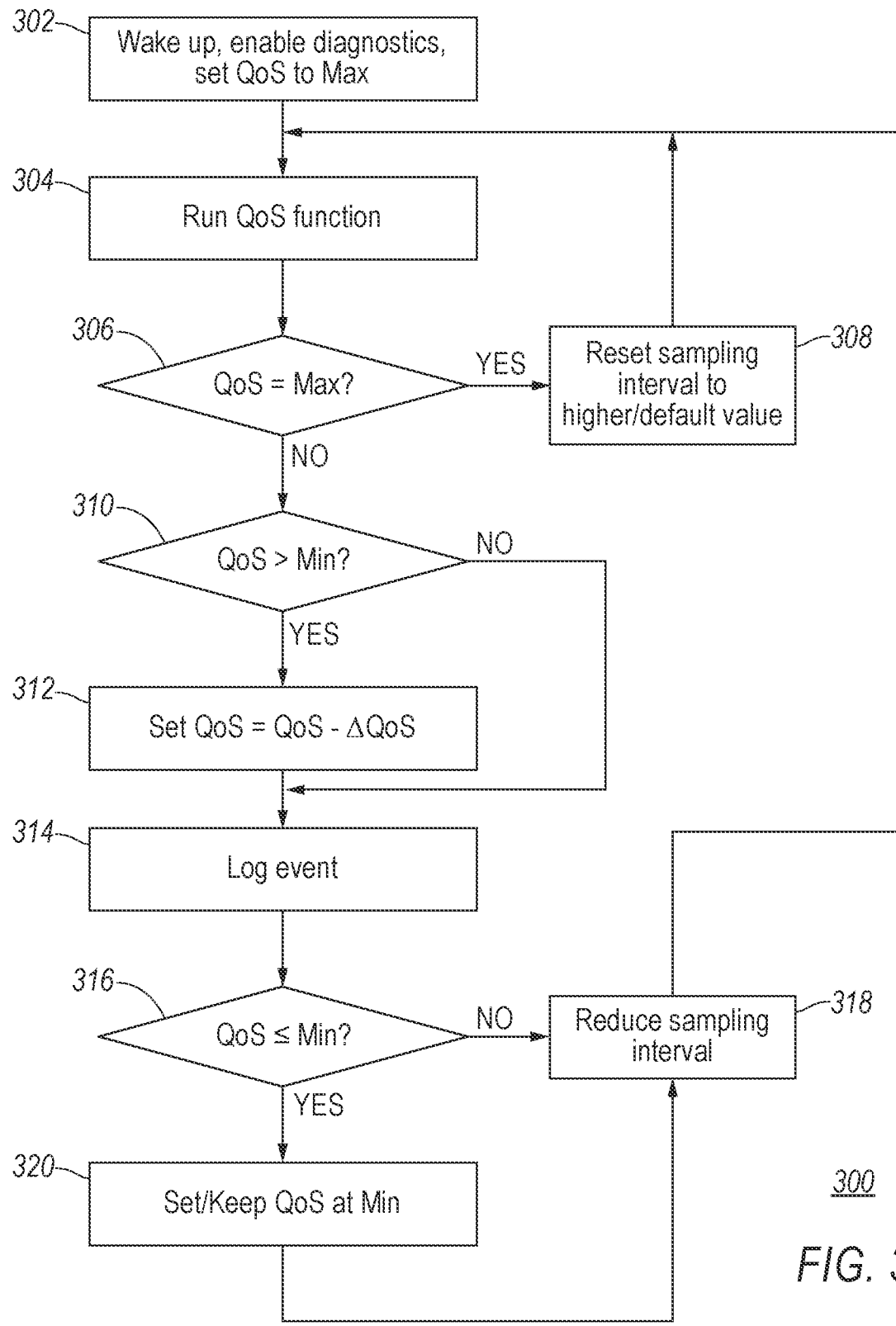
FIG. 3 illustrates an example flow diagram of an interference detection process of one embodiment of the present disclosure.

Referring to FIG. 3, an example flow diagram of an interference detection process 300 of one embodiment of the present disclosure is illustrated. With continuing reference to FIGS. 1 and 2, the process 300 may be performed by one or more RSUs 104 individually or collectively.

At operation 302, the RSU 104 wakes up the diagnostics feature and set a quality-of-service (QoS) level to the maximum which corresponds to the situation that no interference is present. The maximum QoS level may be a number arbitrarily defined to accommodate a specific design need. In the present example, the maximum QoS level (Max QoS) may be set to 100 for demonstrative purposes.

At operation 304, the RSU 104 runs a QoS measurement function to measure the QoS of the wireless communication and detect any interference. The QoS measurement function takes various parameters as input to measure the signal interference experienced by the RSU 104 and output a QoS difference ($\Delta$QoS) for further processing. If no interference or insufficient interference is detected, the QoS difference is set to zero and the QoS remains at the maximum level. For instance, the RSU 104 may measure the interference using a channel busy ratio (CBR) and a package error rate (PER) of wireless data transmission between the RSU 104 and various entities. It is noted that although the CBR and PER are used in the present embodiment to measure the interference, the disclosure is not limited thereto and other parameters may be used for the measurement under essentially the same principle. For instance, the RSU may use a power spectral density (PSD) and a noise received signal strength (RSS) in addition to or in lieu of the CBR and PER to measure the QoS level and signal interference.

In the present embodiment, while the CBR may be measured for all entities (hereinafter "Total_Count") communicating with the RSU 104 (i.e. any distance), the PER may be measure for only those entities (hereinafter "In_Range_Count") located within a predefined distance threshold (e.g. 100 meters) communicating with the RSU 104 to accommodate different types of noise such that the interference may be more accurately measured. Responsive to detecting the currently measured CBR is greater than a result of a CBR subfunction using the Total_Count as an input, and/or detecting the currently measured PER is greater than a result of a PER subfunction using the In_Range_Count as a input, the RSU 104 sets output QoS difference as:

$$\Delta QoS = \frac{Max\_Qos}{Persistence\_Value} \quad (1)$$

wherein the Persistence_Value denotes a hysteresis factor representing the number of persistent interference occurrence sufficient to be classified as an interference event. The Persistence_Value may be any integer that is greater than 1 (e.g. the integer 3). A non-zero output $\Delta$QoS may be indicative of a deteriorating communication quality suggesting a presence of interference. The CBR subfunction may presented below as an example:

$$CBR\ Subfunction\ (TotalCount) = \begin{cases} CBR1 + Total\_Count \times \frac{CBR2 - CBR1}{Count\_CBR}, & \text{if } Total\_Count < Count\_CBR \\ CBR2, & \text{else} \end{cases} \quad (2)$$

In the above equation, CBR1 denotes a low CBR threshold (e.g. 0.25) and the CBR2 denotes a high CBR threshold (e.g. 0.6) that is greater than the low CBR threshold. Count_CBR denotes a threshold (e.g. 100) for the number of all entities communicating with the RSU 104. The PER subfunction may be presented below as an example:

$$PER\ Subfunction\ (In\_Range\_Count) = \begin{cases} PER1 + In\_Range\_Count \times \frac{PER2 - PER1}{Count\_PER}, & \text{if } In\_Range\_Count < Count\_PER \\ PER2, & \text{else} \end{cases} \quad (3)$$

In the above equation, PER1 denotes a low PER threshold (e.g. 10) and the PER2 denotes a high PER threshold (e.g. 70) that is greater than the low PER threshold. Count_PER denotes a threshold (e.g. 100) for the number of entities within the predefined distance threshold communicating with the RSU 104.

The above CBR, PER, and distance thresholds in the present example are provided merely for illustrative purposes. The RSU 104 may be further configured to adjust the CBR, PER, and distance thresholds based on time of the day and the traffic volume. As a general rule, the CBR and PER thresholds may increase and the distance threshold may decrease during rush hours with greater traffic volume, and the CBR and PER thresholds may decrease and the distance threshold may increase during non-rush hours with less traffic volume.

Figure 4A:
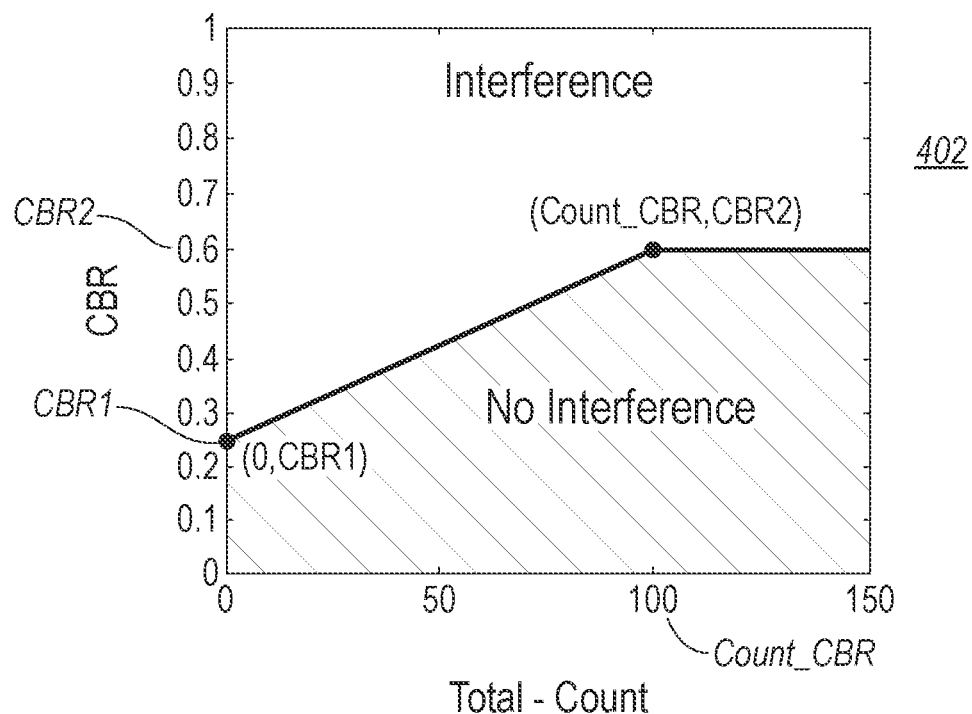
FIGS. 4A and 4B illustrate example graphs of CBR and PER subfunctions of one embodiment of the present disclosure.
Figure 4B:
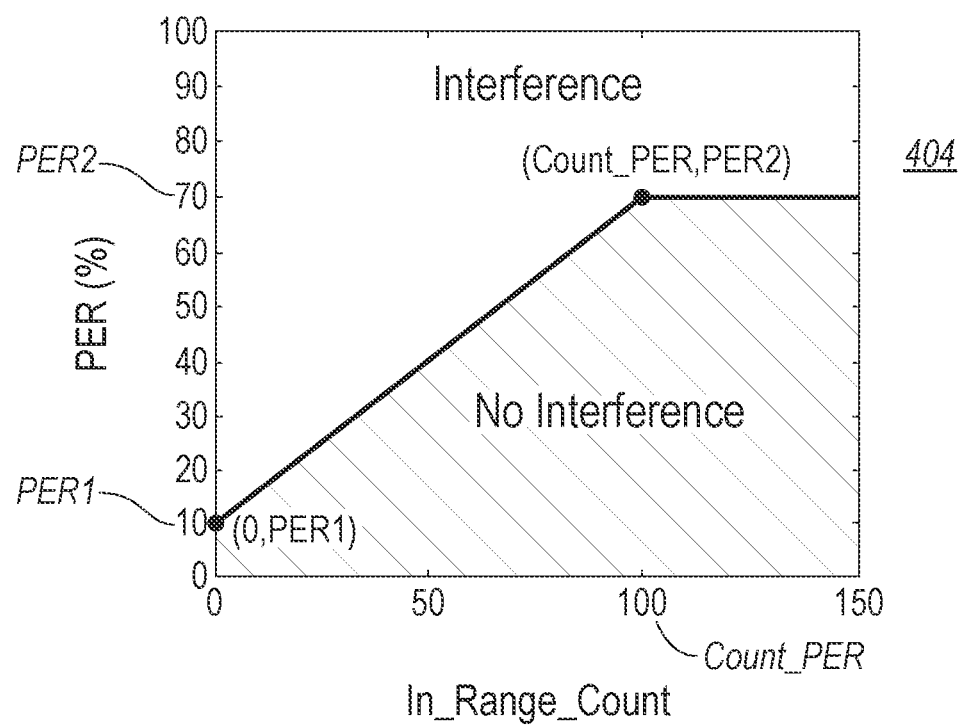

Example Data graphs of the CBR and PER subfunctions are illustrated in FIGS. 4A and 4B. Referring to the CBR data graph 402 illustrated in FIG. 4A, horizontal axis denotes the total number of entities Total_Count communicating with the RSU 104, and the vertical axis denotes the CBR level. The CBR data graph 402 is characterized by two coordinate pairs: (0, CBR1) corresponding to zero communicating entity at the low CBR threshold, and (Count_CBR, CBR2) corresponding to a threshold for the number of all entities communicating with the RSU 104 at the high CBR threshold. The shaded area in the data graph 402 indicates no interference and the unshaded area in the data graph 402 indicates the interference is detected. Referring to the PER data graph 404 illustrated in FIG. 4B, horizontal axis denotes the number of entities In_Range_Count within the distance threshold communicating with the RSU 104, and the vertical axis denotes the PER level. The PER data graph 404 is characterized by two coordinate pairs: (0, PER1) corresponding to zero communicating entity at the low PER threshold, and (Count_PER, PER2) corresponding to a threshold for the number of entities within the distance threshold at the high PER threshold. The shaded area in the data graph 404 indicates no interference and the unshaded area in the PER data graph 404 indicates the interference is detected.

Referring back to FIG. 3, at operation 306, responsive to detecting the current QoS level is at the maximum QoS level Max_QoS indicative of no interference is detected, the process proceeds to operation 308 and continues to sample the wireless communication at a current interval (e.g. 2000 ms). If the QoS is not equal to the maximum QoS level indicative of an interference has been detected, the process proceeds from operation 306 to operation 310 to determine if the QoS is greater than a minimum QoS. The minimum QoS may be a number arbitrarily defined to accommodate a specific design need (e.g. 0). If the answer is a no, the process proceeds to operation 314 to record the interference event in a data log 124. Otherwise, if the QoS is greater than the minimum QoS level, the process proceeds to operation 312 and the RSU 104 reduces the current QoS level using the following equation:

$$QoS=QoS-\Delta QoS \quad (4)$$

The process proceeds to operation 312 to record the event. A variety of data may be recorded into the data log 124. As a few non-limiting examples, the RSU 104 may record a time of the interference event, a location (e.g. latitude, longitude, elevation) of the interference event, the CBR and PER as measured (as well as the PSD and RSS if applicable), The total number of entities Total_Count communicating with the RSU 104, the number of entities within a predetermined distance In_Range_Count, and the QoS level associated with the interference event. In one embodiment, the RSU 104 may further record the identity and address (e.g. media access control (MAC) address) of each entity associated with the interference event via devices such as a Wi-Fi sniffer that is configured to simultaneously scan the communication channels and adjacent channels for Wi-Fi activity. The RSU 104 may further detect and measure one or more specific subchannels in the ITS band experience unlicensed interference and the corresponding interference duty cycle. The data measured by the RSU 104 may be recorded into the data log 124. The data log 124 may be saved in the storage 118 as one or more files and the RSU 104 may individually or collectively upload the data log 124 to the server 126 associated with an authority agency to report the interference.

At operation 316, if the RSU 104 determines the QoS is greater than the minimum level, the process proceeds to operation 318 to reduce the sampling interval to a predetermined value (e.g. every 200 ms) to more frequently monitor the interference. If the RSU 104 determines the QoS less than or equal to minimum level, the process proceeds to operation 320 to set or keep the QoS at the minimum level for the current measurement cycle. The process returns to operation 318.

In an alternative embodiment, the RSU 104 may be configured to estimate harmful interference from a QoS function based on CBR compared with the total number of entities Total_Count in communication with the RSU 104. More specifically, the RSU 104 may estimate CBR level based on accounting for recently received V2X/BSM messages and a surplus due to unknown transmitters. If the surplus CBR due unknown transmitters is above threshold, the RSU 104 may determine a presence of a harmful interference. The present alternative embodiment is related to the embodiment in FIG. 4A. While the FIG. 4A illustrates an embodiment which may compare the CBR with a threshold based on the total number of entities Total_Count, different vehicles may be generating V2X packets of different sizes and at different rates in reality. As a result, the total number of entities Total_Count may not always account for a uniform increase in CBR. For more complex cases involving different packet sizes and transmission rates, the present alternative embodiment may provide the better detection mechanism.

In the present embodiment, the CBR may be measured over a 100 ms time slotted system as the count of subchannels where the RSSI exceeds −94 dBm. As an example, for a 100 ms time interval with 10 subchannels per 20 MHz (e.g. 5905-5925 MHz), there may be a total number of 1,000 Count_Total (i.e. 100×10) radio resources. The radio resources used per V2X packet may be defined and known to the RSU 104 depending on the payload. For example, a 365 byte packet (e.g. a BSM from a vehicle) will always consume 2 subchannels over a 1 ms interval (out of a maximum 10 subchannels spanning a 20 MHz channel) followed by another 2 subchannels over another 1 ms interval for its hybrid automatic repeat request (HARQ) retransmission according to the SAE J3161/1 standard.

The RSU 104 may estimate how much of the CBR is due to these known parameters such as the total number of V2X packets. For example, if 10 BSMs is received in the past 100 ms, the RSU 104 may estimate that 40 radio resources Count_Vehicles (i.e. 10 BSMs×2 subchannels×2 HARQ retransmission) out of 1,000 total were caused by these 10 C-V2X packets. The CBR may be calculated as 40/1,000=0.04). In addition, there may be some randomness due to random noise in each subchannel so the CBR will fluctuate even without additional interference. The ordinary fluctuation from the noise may occasionally cause just a few radio resources (e.g. 2-3) to exceed −94 dBm threshold. Therefore, the CBR threshold may be offset/adjusted by a few radio resources to accommodate the random noise using the following equation:

$$CBR_{Threshold} = \frac{Count\_Vehicles + Offset}{Count\_Total} \quad (5)$$

Continuing with the about example, assuming the offset tolerance is 3, the estimated number of radio resources Count_Vehicles is 40 and the total number of radio resources Count_Total is 1,000, the CBR threshold is equal to 0.043. As an example, if the measured CBR is 0.052 indicative of 9 additional radio resources had an RSSI exceeding −94 dBm are detected (i.e. (0.052+0.043)×1,000), an interference is detected and the RSU 104 may record the CBR data into the log file. The RSU 104 may be further configured to use different offset tolerance value to accommodate different situations. For instance, the RSU 104 may increase the responsive to an increasing number of estimated number of radio resources Count_Vehicles, and decrease responsive to a decreasing number of estimated number of radio resources Count_Vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An infrastructure device, comprising:
   a transceiver, programmed to communicate with a plurality of vehicles, wherein at least one of the vehicles is located within a distance defined from a location of the infrastructure device, and at least one of the vehicles is located outside the distance from the location of the infrastructure device; and
   a controller, programmed to
      measure a channel busy ratio (CBR) for communication with the plurality of vehicles,
      measure a package error rate (PER) for communication with one or more of the vehicles located within the distance,
      responsive to the CBR being greater than a CBR threshold, or the PER being greater than a PER threshold, record an interference event into a log, and adjust the CBR threshold using a number of packets communicated with the vehicles.

2. The infrastructure device of claim 1, wherein the controller is further programmed to:
   responsive to a total number of the plurality of vehicles increasing, increase the CBR threshold; and
   responsive to a number of vehicles located within the distance increasing, increase the PER threshold.

3. The infrastructure device of claim 1, wherein the controller is further programmed to:
   further adjust the CBR threshold using an offset that varies by the total number of the plurality of vehicles.

4. The infrastructure device of claim 1, wherein the controller is further programmed to:
   adjust the CBR threshold and the PER threshold according to a time of a day; and
   adjust the distance according to the time of the day.

5. The infrastructure device of claim 1, wherein the CBR and the PER are measured at a first sampling interval, and the controller is further programmed to:
   responsive to the CBR being greater than the CBR threshold, or the PER being greater than the PER threshold, measure the CBR and the PER at a second sampling interval shorter than the first sampling interval.

6. The infrastructure device of claim 1, wherein the controller is further programmed to:
   responsive to detecting the interference event consecutively for a predefined persistence threshold, suspend to measure the CBR and the PER.

7. The infrastructure device of claim 1, wherein the log includes a total number of the vehicles, a number of the vehicles located within the distance, and the distance, the controller is further programmed to:
   upload the log to a server via a communication network.

8. The infrastructure device of claim 7, wherein the log further includes media access control (MAC) address of an entity emitting a noise, and a channel in which the noise is emitted.

9. A communication device, comprising:
   a wireless transceiver, programmed to communicate with a plurality of entities, wherein at least one of the entities is located within a geo-fence defined around a location of the communication device, and at least one of the entities is located outside the geo-fence; and
   a controller, programmed to
      measure a first parameter for communications with the plurality of entities,
      measure a second parameter for communications with one or more of the entities located within the geo-fence, the second parameter being different from the first parameter, and
      responsive to the first parameter being greater than a first threshold, and the second parameter being greater than a second threshold, record an interference event into a log, wherein the first threshold is a variable that increases with an increasing total number of the plurality of entities.

10. The communication device of claim 9, wherein the first parameter and the second parameter are selected from: channel busy ratio (CBR), package error rate (PER), power spectral density (PSD), and received signal strength (RSS).

11. The communication device of claim 9, wherein the second threshold is a variable that increases with an increasing number of vehicles located within the geo-fence.

12. The communication device of claim 9, wherein the controller is further programmed to:
adjust a size of the geo-fence according a time of a day.

13. The communication device of claim 9, the log includes a total number of the entities, a number of the entities located within the geo-fence, and a location of the geo-fence.

14. The communication device of claim 9, wherein the controller is further programmed to:
responsive to detecting the interference event consecutively for a predefined persistence threshold, suspend to measure the first parameter and the second parameter.

15. A method for a communication device comprising:
defining, via a processor, a geo-fence within a distance threshold from the communication device;
measuring, via a transceiver, a channel busy ratio (CBR) for communications with a plurality of vehicles having at least one vehicle located within the geo-fence and at least one vehicle located outside the geo-fence;
measuring, via the transceiver, a package error rate (PER) for communications with one or more of the vehicles located within the geo-fence;
responsive to the CBR being greater than a CBR threshold, and the PER being greater than a PER threshold, record, via the processor, an interference event into a log; and
adjusting, via the processor, the distance threshold according to a time of a day.

16. The method of claim 15, further comprising:
adjusting, via the processor, the CBR threshold using a total number of the plurality of vehicles; and
adjusting, via the processor, the PER threshold using a number of the vehicles located within the geo-fence.

17. The method of claim 15, further comprising:
responsive to the CBR being greater than a CBR threshold, increasing, via the processor, a sampling frequency to measure the CBR and the PER.

* * * * *